(12) United States Patent
Thiel

(10) Patent No.: US 8,467,124 B2
(45) Date of Patent: Jun. 18, 2013

(54) SOLAR REFLECTING MIRROR AND METHOD OF MAKING SAME

(75) Inventor: James P. Thiel, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 651 days.

(21) Appl. No.: 12/709,091

(22) Filed: Feb. 19, 2010

(65) Prior Publication Data

US 2011/0203578 A1     Aug. 25, 2011

(51) Int. Cl.
*F21V 13/02*     (2006.01)
*F24J 2/12*      (2006.01)

(52) U.S. Cl.
USPC ........... 359/359; 359/851; 359/853; 359/866; 136/246; 136/256; 126/684

(58) Field of Classification Search
USPC ............... 359/359, 360, 851, 853, 866, 871, 359/883; 136/246, 256, 257; 126/684, 688–690
See application file for complete search history.

(56) References Cited

U.S. PATENT DOCUMENTS

| | | | |
|---|---|---|---|
| 3,333,936 A | 8/1967 | Warren | |
| 4,209,222 A * | 6/1980 | Posnansky | 359/359 |
| 4,238,276 A | 12/1980 | Kinugawa et al. | |
| 4,253,895 A * | 3/1981 | Chenault | 156/163 |
| 4,402,722 A | 9/1983 | Edge | |
| 5,030,594 A | 7/1991 | Heithoff | |
| 5,270,615 A | 12/1993 | Chang | |
| 5,830,252 A | 11/1998 | Finley et al. | |
| 6,027,766 A | 2/2000 | Greenberg et al. | |
| 6,337,124 B1 | 1/2002 | Anderson et al. | |
| 7,240,519 B2 | 7/2007 | Schwartz et al. | |
| 7,329,433 B2 | 2/2008 | O'Shaughnessy et al. | |
| 7,437,892 B2 | 10/2008 | Siskos | |
| 7,556,868 B2 | 7/2009 | Thiel et al. | |
| 2004/0085659 A1 * | 5/2004 | Lasich | 359/853 |
| 2007/0243355 A1 | 10/2007 | Scott et al. | |
| 2008/0182033 A1 | 7/2008 | Krasnov et al. | |
| 2009/0101208 A1 * | 4/2009 | Vandal et al. | 136/259 |
| 2009/0165842 A1 * | 7/2009 | McDonald et al. | 136/246 |
| 2009/0211636 A1 * | 8/2009 | Lin | 136/259 |
| 2010/0126218 A1 | 5/2010 | Shelestak et al. | |
| 2010/0263709 A1 * | 10/2010 | Norman et al. | 136/246 |
| 2012/0240975 A1 * | 9/2012 | Ono | 136/246 |

FOREIGN PATENT DOCUMENTS

| | | |
|---|---|---|
| DE | 10 2005 000 911 B4 | 7/2006 |
| EP | 0 071 865 A2 | 2/1983 |
| EP | 0 705 801 A1 | 4/1996 |
| WO | 00/15571 A1 | 3/2000 |

OTHER PUBLICATIONS

Martine Chaissac et al, "Behaviour of RF Sputter Deposited SiO2 and Al2O3 Diffusion Barriers on Float Glass at 300 Degrees C in Air", vol. 66, No. 12, Dec. 1, 1993, pp. 331-333, XP002029748.
U.S. Appl. No. 61/164,047, filed Mar. 27, 2009.
U.S. Appl. No. 12/709,045, filed Feb. 19, 2010.
PCT Search Report for PCT/US2010/027556, dated May 31, 2010.

* cited by examiner

*Primary Examiner* — Frank Font
(74) *Attorney, Agent, or Firm* — Andrew C. Siminerio

(57) ABSTRACT

A solar reflecting mirror having a curved reflective surface includes a plurality of transparent shaped segments held together by securing facilities to provide a shaped transparent substrate having a convex surface and an opposite concave surface, the concave surface having a focal area. A solar reflecting coating is provided over the convex surface of the shaped substrate to reflect visible and infrared waves of the electromagnetic scale to the focal area of the shaped transparent substrate. A method of making the solar mirror is also disclosed.

16 Claims, 8 Drawing Sheets

SOLAR REFLECTING MIRROR AND METHOD OF MAKING SAME

CROSS REFERENCE TO RELATED APPLICATION

This application is related to U.S. patent application Ser. No. 12/709,045 filed even date in the name of Abhinav Bhandari, Harry Buhay, William R. Siskos and James P. Thiel and titled SOLAR REFLECTING MIRROR HAVING A PROTECTIVE COATING AND METHOD OF MAKING SAME. Application Ser. No. 12/709,045 in its entirety is incorporated herein by reference.

BACKGROUND OF THE INVENTION

1. Field of the Invention

This invention relates to a solar reflecting mirror, e.g. a parabolic shaped solar reflecting glass mirror and a method of making same and more particularly, to a solar reflecting mirror made of shaped mirror segments.

2. Description of the Available Technology

At the present time, there is interest to increase the efficiency of solar collectors, e.g. and not limiting to the discussion, improve the efficiency of solar mirrors, e.g. parabolic shaped mirrors, used to reflect the sun's rays to a device located at the focal point of the parabolic mirror. The device is usually of the type known in the art to convert the sun's energy to another form of useable energy, e.g. electric energy and/or heat. In another embodiment of the prior art, the parabolic mirror is a primary mirror reflecting the sun's rays to a secondary mirror positioned relative to the focal point of the primary mirror to reflect the sun's rays to the converting device.

In general, the parabolic shaped mirror includes a parabolic shaped substrate having a reflective surface, e.g. a silver coating on the convex surface of the shaped substrate. The preferred material of the shaped substrate is soda-lime-silica glass because of the high yield in shaping a flat glass sheet to a parabolic sheet or substrate; the low cost of making flat glass sheets, and the high yield and low cost of applying a solar reflective coating on a surface of the shaped glass substrate.

Although soda-lime-silica glass is an acceptable material for the substrate for solar reflecting mirrors, there are limitations to the use of glass. More particularly, in the shaping process, a flat glass sheet is heated to temperatures above 1200° Fahrenheit (hereinafter also referred to as "F") and shaped into the parabolic shape. During the heating and shaping of the glass sheet, the alkali ions, e.g. the sodium ions in the glass sheet diffuse, or leech, out of the glass sheet. Further, during exposure of the parabolic shaped glass substrate to solar energy, e.g. long-term environmental exposure, additional sodium ions leech out of the glass substrate. As is appreciated by those skilled in the art, the leeching or diffusion of the sodium ions from the glass is an expected occurrence, and at low temperatures is a slow process. However, heating the glass and/or the long term environmental exposure of the glass to solar energy accelerates the leeching or diffusion of sodium ions out of the glass, and increases the amount of sodium ions that leech out of the glass. The sodium ions leeching out of the glass react with moisture in the atmosphere, and convert from sodium ions to sodium compounds, e.g. sodium hydroxide and sodium carbonate. The sodium compounds can etch the surface of the glass and can deposit as a precipitate on the surface of the glass. The sodium compound precipitates decrease the transmission of visible light through the glass, e.g. in the case of the parabolic shaped glass substrate, decrease transmission of solar energy to the reflective coating on the convex surface of the shaped glass substrate, and decrease the transmission of the solar energy reflected from the reflecting coating through the shaped glass substrate to the concave surface of the shaped glass substrate.

Further as is appreciated by those skilled in the art, the surface of the shaped glass substrates is a specular surface, and the solar energy is incident on the concave surface of the glass substrate as parallel light rays. The parallel light rays are reflected from the concave surface, and reflected from the reflective coating, as convergent light rays. The sodium compound precipitate on the concave glass surfaces converts the specular surface to a non-specular or diffusing surface directing the light rays reflected from, and passing through, the precipitate away from the focal point of the primary mirror. The term "specular surface" as used herein means a light reflective surface where a light ray incident on the reflective surface has an angle of incidence equal to the angle of reflection. The term "non-specular or diffusing surface" as used herein means a reflective surface where a light ray incident on the reflective surface has an angle of incidence different from the angle of reflection.

Present techniques to remove and/or to eliminate the sodium compound precipitate from the concave surface of a parabolic mirror include cleaning the surfaces and/or enclosing the concave surface of the mirror to provide a sealed chamber having an inert gas to prevent the sodium ion from forming the precipitate. Present techniques for removing scratches include buffing the surfaces of the glass sheet having the scratches. All of these techniques to ensure the surfaces of the solar mirror remain a specular surface are expensive.

Barrier layers are known in the art, e.g. disclosed in U.S. Pat. Nos. 4,238,276; 5,270,615; 5,830,252 and 6,027,766, and U.S. patent application Ser. No. 08/597,543; U.S. patent application Ser. No. 12/709,045 filed even date in the name of Abhinav Bhandari et al and titled SOLAR REFLECTING MIRROR HAVING A PROTECTIVE COATING AND METHOD OF MAKING SAME, and U.S. Publication 2007/0275253A1. One of the limitations of the presently available alkali barrier layers and/or scratch resistant layers is that they are efficient for use on flat or shaped surfaces of glass substrates, but are not efficient for use on a flat surface that is subsequently shaped to a curved surface, e.g. a concave surface of a parabolic mirror. There is little, if any, recognition or discussion in the prior art of the problems that have to be solved when a substrate coated with a barrier layer and/or a scratch resistant layer is shaped from a flat-coated substrate to a parabolic shaped coated substrate. More particularly, there is little, if any, discussion in the prior art of eliminating the cracks in, and/or the buckling of, the coating as the contour of the coated glass is changed from a glass piece having flat surface to a shaped glass substrate having a concave surface. As is recognized by the instant application, when the barrier coating is stressed, the coating cracks and the sodium ions are exposed to the atmosphere and form the sodium compound precipitate on the surfaces of the glass substrate, and/or when the barrier coating and/or the scratch resistant coating buckles the surface changes from a specular surface to a non-specular or diffusing surface.

As can now be appreciated by those skilled in the art, it would be advantages to provide a solar reflecting mirror and method of making a solar reflecting mirror that does not change, or does minimizes the change of, the reflecting surface from a specular surface to a non-specular or diffusing surface.

SUMMARY OF THE INVENTION

This invention relates to a solar reflecting mirror having a curved reflective surface. The mirror includes, among other things, a plurality of transparent shaped segments; securing means to hold the segments together to provide a shaped transparent substrate having a convex surface and an opposite concave surface having a focal area and a solar reflecting coating over one of the surfaces of the shaped substrate, wherein the coating reflects visible and infrared waves of the electromagnetic spectrum toward the focal area of the shaped transparent substrate.

This invention further relates to a method of making a shaped solar reflecting mirror. The method is accomplished by, among other things, shaping two or more flat transparent segments to provide two or more shaped transparent segments wherein each of the shaped transparent segments comprises (1/(total segments of the shaped transparent substrate)) part of the shaped glass transparent substrate; securing the shaped transparent segments together to provide the shaped transparent substrate, wherein the shaped transparent substrate includes, among other things, a convex surface and opposite concave surface having a focal area, and providing a reflective coating over at least one of the surfaces of the transparent substrate.

DESCRIPTION OF THE PREFERRED EMBODIMENTS OF THE INVENTION

Figure 1:
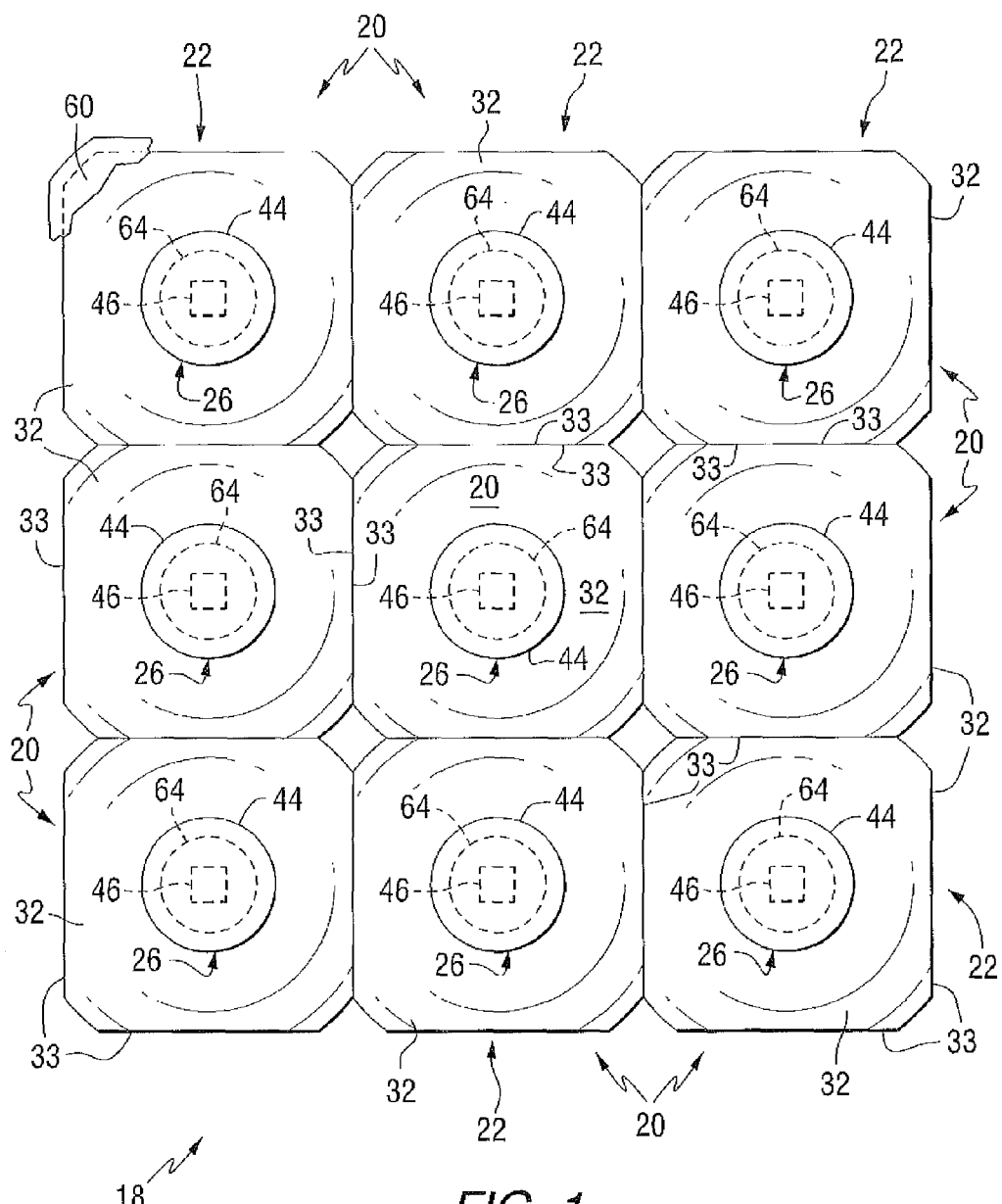
FIG. 1 is an elevated plan view of a prior art array of solar collectors.

In the following discussion, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about." Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all sub-ranges subsumed therein. For example, a stated range of "1 to 10" should be considered to include any and all sub-ranges between (and inclusive of) the minimum value of 1 and the maximum value of 10; that is, all sub-ranges beginning with a minimum value of 1 or more and ending with a maximum value of 10 or less, e.g., 1 to 6.7, or 3.2 to 8.1, or 5.5 to 10. Also, as used herein, the terms "applied over", or "provided over" mean applied, or provided on but not necessarily in surface contact. For example, a material "applied over" a substrate or a substrate surface does not preclude the presence of one or more other materials of the same or different composition located between the deposited material and the substrate or substrate surface.

Before discussing several non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise, in the following discussion like numbers refer to like elements.

Non-limiting embodiments of the invention will be discussed using magnetron sputtering vacuum deposition (hereinafter also referred to as "MSVD") coating process to apply a coating or layer or film over, or on, a substrate surface that is a barrier to alkali ions, e.g. prevents the sodium ions from reacting with moisture in the atmosphere and converting the sodium ions to sodium compounds, e.g. sodium hydroxide and sodium carbonate, which compounds precipitate on the surface of the glass as discussed above. As is appreciated, the invention is not limited to the coating process, and the coating process can be any coating process that applies or coats an alkali ion, e.g. a sodium ion, barrier film or layer on, or over, a glass surface. Further, non-limiting embodiments of the invention can be practiced on coated and uncoated sheets and segments. In the preferred practice of the invention, an alkali ion barrier coating or layer is applied to a surface of a sheet or segment to be shaped in accordance to the teachings of the invention.

As is appreciated, the glass substrate or piece is not limiting to the invention, and the glass can be a glass of any composition; the glass can be clear or colored glass, and/or the glass can be annealed, heat strengthened or tempered glass. The glass piece or substrate can have any shape, thickness and size. The non-limiting embodiments of the invention are presented as the embodiments relate to shaped solar reflecting mirrors; the invention, however, is not limited thereto, and the invention can be practiced in the manufacture of commercial and residential windows; transparencies for air, space, land and water vehicles; glass for thin film photovoltaic applications; electrically heated glass for anti-fog commercial refrigerators, and glass for furniture use.

In the following discussion, the shaped solar reflecting mirror is referred to as a parabolic shaped reflecting mirror, however, the invention is not limited thereto, and the invention, unless indicated other wise can be practiced with any mirror having a curved reflective surface and a focal point or focal area, e.g., but not limiting to the invention, a parabolic shaped mirror, and a spherical shaped mirror. A "focal point" and "focal area" is defined as a position where more than 80% of the solar rays reflected from the mirror converge. The size and location of the "focal area" is not limiting to the invention, and in one non-limiting embodiment of the invention, the "focal area" is less than one fifth (⅕) of the reflecting area of mirror.

Shown in FIG. 1 is an array 18 of shaped solar collectors 20 of the prior art to convert solar energy to electric energy. The invention is not limited to the manner of joining the solar collectors 20 in the array 18 and any techniques known in the art can be used to join the solar collectors 20 in the array 18. Further, the invention is not limited to the number of solar collectors 20 in the array 18, e.g. the invention can be practiced on one solar mirror 20 and an array of 2, 3, 4, 5, 10, 20, greater than 50 and any number combination of collectors 20. Still further, the invention contemplates an array 18 of solar collectors 20 mounted in any convenient manner in a stationary position, or an array 18 of solar collectors 20 mounted in any convenient manner to follow the path of the sun to maximize exposure of the solar collectors to solar energy. In addition, each of the solar collectors 20 in the array 18 can have the same or have different designs to collect the solar energy, and/or to convert the solar energy to an alternative energy source.

Figure 2:
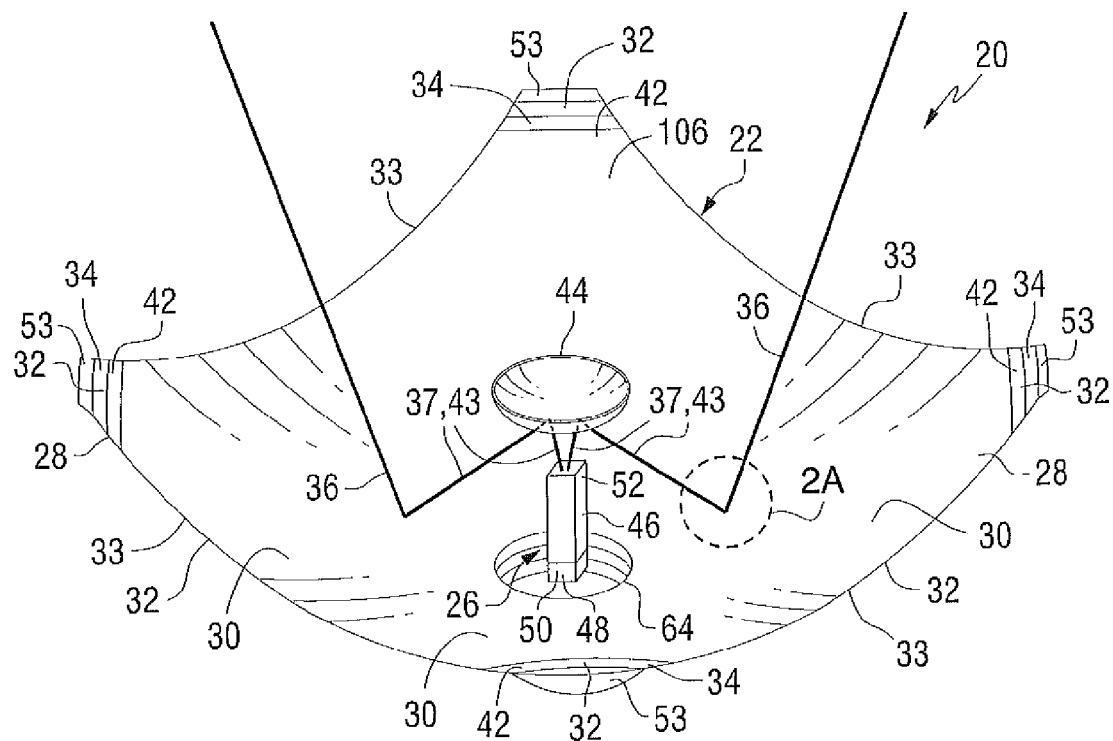
FIG. 2 is an isometric view of a prior art solar collector.

With reference to FIG. 2, each of the solar collectors 20 includes a shaped reflective mirror, e.g. parabolic shaped mirror 22 (also referred to herein as a "primary mirror") to focus the solar energy on device 26 to convert the solar energy to electric energy or heat. The parabolic shaped mirror 22 includes a parabolic shaped glass substrate 28. The glass substrate 28 preferably has a total iron content of less than 0.020 weight percent, a 90% transmission in the visible range, e.g. 350 to 770 nanometers ("nm"), of the electromagnetic spectrum, and in the infrared ("IR") range, e.g. greater than 770 nm to 2150 nm of the electromagnetic spectrum, and a low absorption, e.g. below 2% in the visible range and the IR range. Glasses having the preceding optical properties are disclosed in U.S. patent application Ser. No. 12/275,264 filed Nov. 21, 2008 and U.S. Pat. No. 5,030,594, which documents in their entirety are incorporated herein by reference. PPG Industries, Inc. sells glasses having the above properties under the trademarks STARPHIRE and SOLARPHIRE PV.

The shaped glass substrate 28 has a concave surface 30 and an opposite convex surface 32. The periphery of shaped glass substrate 28 has sides 33. As shown in FIG. 1, the sides 33 of adjacent solar collectors 20 contact one another to maximize coverage of a given area with reflective surfaces. A reflective coating, layer or film 34 (clearly shown in FIG. 2) is over and preferably on the convex surface 32 of the shaped glass substrate 28. The reflective film 34 can be metal, e.g. but not limited to silver, aluminum, nickel, stainless steel or gold. Usually the reflective film 34 is silver.

Figure 2A:
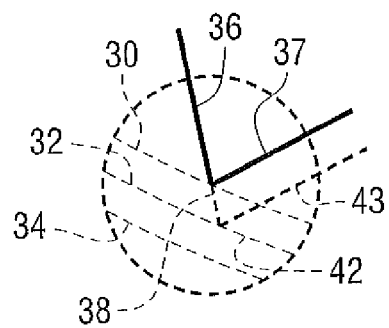
FIG. 2A is an enlarged view of a sun's ray incident on the concave surface of the solar collector.

With continued reference to FIG. 2, the parallel solar energy rays represented by rays 36 are incident on the concave surface 30. A portion 37 of the rays 36 is reflected from the concave surface 30 to the converting device 26, and a portion 38 passes through the concave surface 30, and through the shaped glass substrate 28, and is reflected from surface 42 of the reflective film 34 back through the shaped glass substrate 28 as reflected ray 43 (see FIG. 2A) to the converting device 26. The solar energy rays are shown in FIG. 2 as two rays 36 for purpose of clarity and simplicity instead of the infinite number of parallel solar energy rays incident on the concave surface 30. Further, as is appreciated by those skilled in the art, there is reflection of the solar rays between the concave surface 30 and the convex surface 32 of the shaped glass substrate 28; however, a detailed discussion of the transmission, absorption and reflection of the solar energy rays incident on, and passing through a transparent substrate is well known in the art and no further discussion is deemed necessary.

In the embodiment shown in FIGS. 1 and 2, the converting device 26 includes a secondary mirror 44 positioned relative to the focal point of the parabolic shaped mirror or primary mirror 22, and an optical rod or light bar 46 (clearly shown in FIG. 2) at the focal area of the primary mirror 44. Multi-junction solar cells 48 are positioned at end 50 of the light bar 46. With this arrangement the reflected rays 37 and 43 (see FIG. 2A) are incident on the secondary mirror 44; the secondary mirror reflects the rays 37 and 43 to end 52 of the light bar 46 (clearly shown in FIG. 2). The rays 37 and 43 pass through the light bar 46 and out of the end 50 of the light bar 46, and are incident on the solar cells 48 to convert the solar energy to electric energy. As is appreciated by those skilled in the art, the solar cells 48 can be positioned at the focal point of the primary mirror 22 to eliminate the secondary mirror 44.

The invention is not limited to the shape of the secondary mirror 44. More particularly, the secondary mirror in the practice of the invention preferably has a flat reflective surface. In the practice of the invention, the secondary mirror was a circular piece of flat glass having a silver coated surface. The invention, however, can be practiced using a shaped secondary mirror having concave and convex surfaces and a reflective coating on at least one of the surfaces, e.g., the convex surface.

With reference to FIG. 1, a cover 60 (partially shown in upper left hand corner of FIG. 1) is supported over the array of solar collectors to prevent dust and water from depositing on the concave surface 30 of the parabolic shaped mirror 22 of the solar collectors 20. As is known in the art, the cover 60 is transparent to the visible and IR wavelength ranges of the electromagnetic scale. Optionally the shaped glass substrate 28 of the primary mirror 22 has a cut out 64 (clearly shown in FIG. 2) at the bottom of the glass shaped substrate 28 to provide access to the light bar 46 and the solar cells 48.

As discussed above in the section titled "Description of The Available Technology," a limitation of the presently available solar collectors is the use of soda-lime-silica glass substrates for the primary mirror 22 and for the secondary mirror 44. The glass substrates are usually cut glass pieces cut from a continuous glass ribbon made by the float glass process, e.g. the glass making process disclosed in U.S. Pat. Nos. 3,333,936 and 4,402,722, which patents in their entirety are hereby incorporated by reference. As is well known in the art, the soda-lime silicate glass contains sodium ions. The long term environment exposure, e.g. to the solar rays 36 impinging on the primary mirror 22 heats the shaped glass substrate 28, and the heating of the glass to form the parabolic shaped substrate 28, provides energy for sodium ions to diffuse or leech out of the shaped glass substrate 28. The sodium ions leeching out of the shaped glass substrate 28 at the surfaces 30 and 32 react with the moisture in the atmosphere, and convert the sodium ions to sodium compounds, e.g. sodium hydroxide and sodium carbonate. The sodium compounds deposit as a precipitate on the surfaces of the shaped glass substrate 28. The sodium compound precipitate on the concave surface 30 of the shaped glass substrate 28 decreases the visible light transmission of the shaped glass substrate 28 and makes portions of the concave surface 30 having the sodium compound precipitate a non-specular or diffusing surface directing the reflected rays 37 and 43 away from the focal point of the primary mirror 22, or away from the secondary mirror 44. There is minimal, if any, sodium compound precipitate on the convex surface 32 of the primary mirror 22 because the convex surface has the reflective coating 34 and a protective plastic coating or film 53 (shown only in FIG. 2) over the reflective coating. As is known in the art, the protective coating 53 protects the reflective coating 34 from the environment, and in the practice of the invention, the protective coating 53 prevents sodium ions at the convex surface 32 of the glass substrate 28 from reacting with the environment to form the sodium precipitates. Although the protective coating 53 for the reflective coating 34 prevents the formation of sodium compound precipitates, the invention contemplates the practice of the invention on the convex surface 32 of the glass substrate 28. As can now be appreciated, the secondary mirror 44, which is made of soda-lime silica glass, can have the same drawbacks as the primary mirror 22 except that the sodium compound precipitate on the secondary mirror directs the reflected rays from the primary mirror 22 away from the light rod 46.

Figure 3:
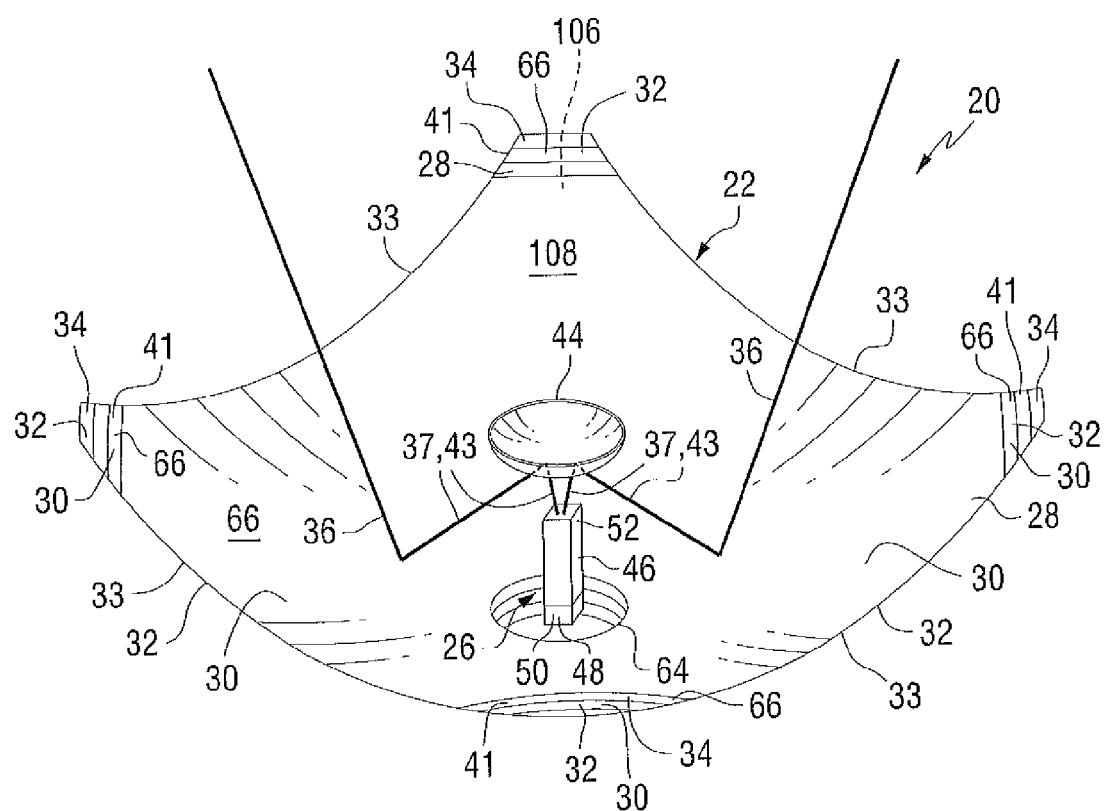
FIG. 3 is a view similar to the view of FIG. 2 showing a solar mirror of the invention.

With reference to FIG. 3, in one non-limited embodiment of the invention, the concave surface 30 of the shaped glass substrate 28 of the primary mirror 22 has a sodium barrier coating or layer or film 66.

Figure 4:
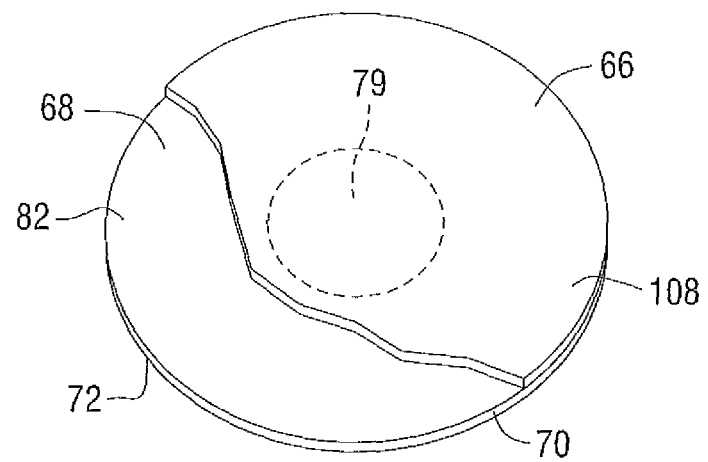
FIG. 4 is an isometric view of a piece of glass having a coating of the invention, the coating in FIG. 4 having portions removed for purposes of clarity.

With reference to FIG. 4, the sodium barrier coating 66 is applied over and preferably on surface 68 of a circular shaped flat glass piece 70. The surface 68 of the glass piece 70 is designated to be the concave surface 30 of the shaped glass substrate 28. In the practice of the invention the barrier layer 66 preferably transmits greater than 90%, more preferably greater than 95% and most preferably 100% of the visible and IR spectrum of the electromagnetic wavelength. The barrier layer 66 preferably can withstand temperatures greater than the shaping or bending temperature of the glass, e.g. temperatures greater than 1220° Fahrenheit ("F") for soda-lime silica glass. Further, the barrier layer 66 preferably does not crack and/or buckle during shaping of the glass piece 70 to the extent that alkali ions, e.g. sodium ions, can not move through the cracks in the barrier coating 66, and the buckling does not significantly deflect the rays 37 and 43 away from the focal point of the parabolic shaped mirror 22. A discussion of cracks in the barrier coating 66 and buckling of the barrier coating 66 is presented in more detail below.

In one non-limiting embodiment of the invention, the circular flat glass piece 70 had a diameter of 18 inches (45.72 centimeters ("cm") and a thickness of 0.083 inch (2.1 millimeters ("mm")). An 800 angstrom thick barrier coating 66 of an oxide of 85 atomic percent silicon and 15 atomic percent aluminum was deposited on the surface 68 of the glass piece 70 (designated to be the concave surface 30 of the shaped glass substrate 28) by the MSVD coating process. The surface 72 of the glass piece designated to be the convex surface 32 of the shaped glass substrate 28 was placed on open end 74 of a vacuum-shaping mold 76 (see FIG. 5A). The glass piece 70 and the mold 76 were heated in a furnace (not shown) to heat the glass piece to a temperature of 1220° F. (660° centigrade ("C")). The coated glass piece 70 and the vacuum-mold 76 were uniformly heated in any usual manner. After the coated glass piece 70 and the vacuum mold 76 were heated to 1220° F. (660° C.), air was evacuated from the interior 78 of the mold 76 by way of spaced holes 77 to force the heated glass piece 70 into the interior 78 of the vacuum mold 76 to provide the shaped glass substrate 28 having the coating 66 (see FIG. 5B). The heated shaped glass substrate was controllable cooled to anneal the shaped glass substrate. As can be appreciated, the invention contemplates heating the glass piece 70 and the vacuum mold 76 separately, and thereafter placing the glass piece 70 on the open end 74 of the vacuum mold 76, and shaping the glass piece 70 as described above. Processes and equipment for heating glass, shaping glass in vacuum molds, for annealing glass and coated glass are well known in the art and no detailed discussion is deemed necessary.

During the shaping process, as the flat glass piece 70 (see FIG. 4) is biased or pulled into the interior 78 of the vacuum mold 76, center portion 79 of the flat glass piece 70 is stretched. As a result of the stretching, the thickness at bottom area 80 of the shaped glass substrate 28 (see FIG. 5B) (corresponding to the center portion 79 of the glass piece 70 in FIG. 4 and the hole 64 in FIG. 3) is 80% of the thickness of the center portion 79 of the flat glass piece 70 (see FIG. 4), and the thickness of the marginal edge 81 of the shaped glass substrate 28 (see FIG. 5B) is 105% of the thickness of marginal edge 82 of the flat glass piece 70 (see FIG. 4). As can be appreciated, the marginal edge 81 of the shaped glass substrate 28 is highly strained and has optical distortion. In the practice of the invention, but not limited thereto, a segment 83 of the shaped glass substrate 28 (see FIG. 5B) was cut off to remove portions of the highly strained and optically distorted glass and to position the sides 33 of adjacent ones of the shaped solar mirrors 20 against one another as shown in the array 18 (see FIG. 1). In the practice of the invention, but not limiting to the invention, a section of about 2 inches measured from peripheral edge 84 toward the bottom 80 (see FIG. 5B) of the shaped glass substrate 28 was cut off. Additional portions of the peripheral edge of the shaped glass substrate were removed to provide the sides 33 (see FIG. 3) of the shaped glass substrate 28. The cut out or hole 64 (see FIG. 3) was cut in the bottom area 80 (see FIG. 5B) of the shaped glass substrate 28. Thereafter, the reflective coating, e.g. a silver layer 34 was applied over the convex surface 32 of the shaped glass substrate 28 (see FIG. 3), and the protective film 53 (see FIG. 2) was applied on the reflective coating 34.

As is appreciated, the invention is not limited to the process of cutting the hole 64 in the bottom area 80 (see FIG. 5B) of the shaped glass substrate 28, cutting the peripheral edge 24 of the shaped glass substrate, or to the coating process to apply the reflective coating 34 and the protective coating 53 over the convex surface 32 of the shaped glass substrate 28, and any cutting and/or coating techniques known in the art can be used in the practice of the invention.

Figure 6:
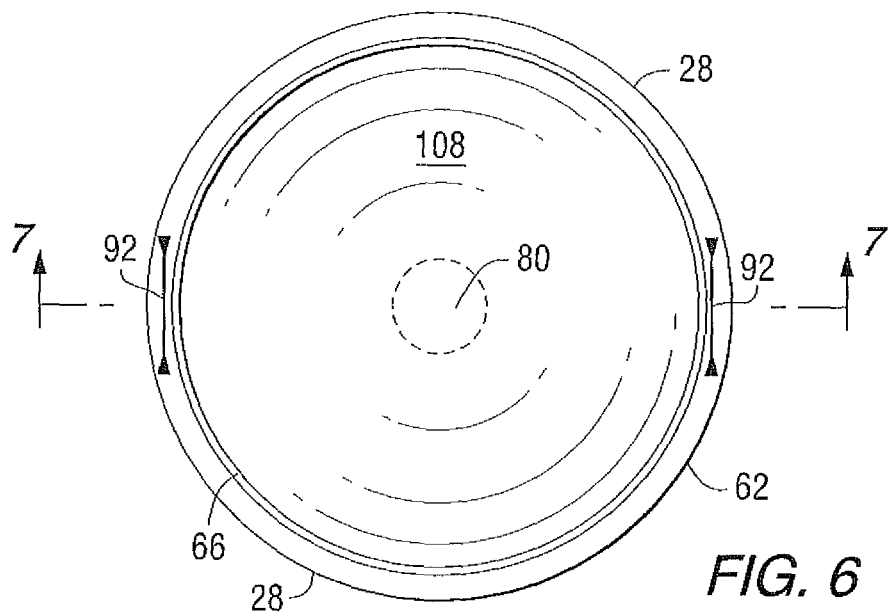
FIG. 6 is an elevated top view of the shaped glass substrate of the invention showing the pattern of circumferential compressive strains at the periphery of the shaped glass substrate.
Figure 7:
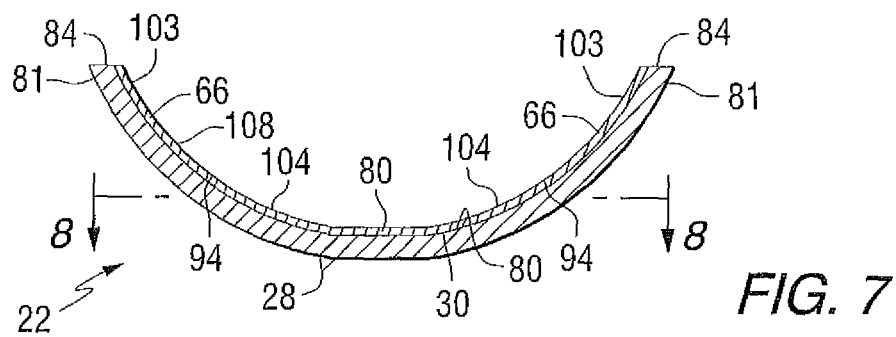
FIG. 7 is a view taken along line 7-7 of FIG. 6 showing, among other things, the transition strain line of the shaped glass substrate.
Figure 8:
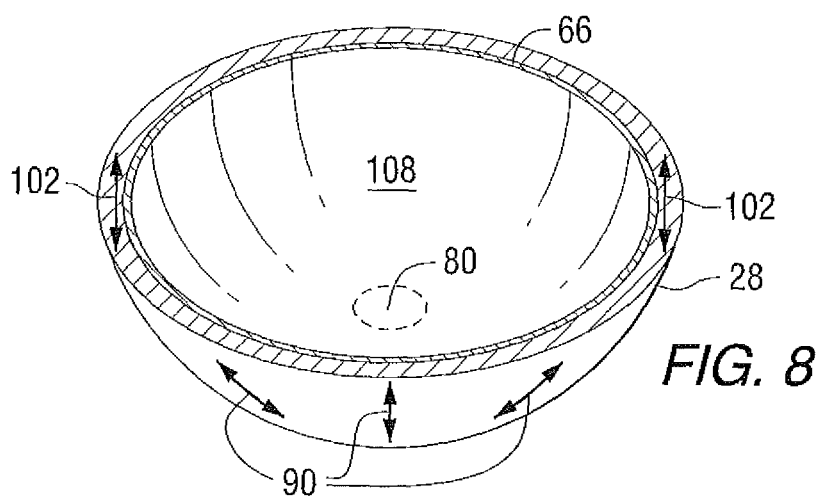
FIG. 8 is a view taken along line 8-8 of FIG. 7 showing the circumferential tensile strain and the radial tensile strain of the shaped glass substrate.

At a temperature in the range of 1200°-1300° F. (649°-704° C.), the glass piece 70 is heat softened or viscous; on the other hand, the barrier coating 66, e.g. the oxide of aluminum and silicon is a refractory material and remains dimensionally stable at a temperature in the range of 1200°-1300° F. (649°-704° C.). As used herein, the term "dimensionally stable" means that the physical dimensions of the coating during and/or after heating of the glass piece does not change more than ±5% or preferably not more than ±2%. During the shaping of the flat glass piece 70 to the shaped glass substrate 28, the strain pattern shown in FIGS. 6-8 develops in the shaped glass substrate 28. With reference to FIGS. 6-8, as needed, radial tension strain shown by number 90 are present at the bottom portion of the shaped glass substrate (see FIG. 8), and circumferential compression strain shown by the number 92 are present at the periphery 84 of the shaped glass substrate 28. The barrier coating 66 experiences the stresses due to being adhered to the concave surface of the glass substrate. As the distance from the periphery 84 of the shaped glass substrate 28 increases in a direction toward the bottom area 80 of the shaped glass substrate 28 (see FIG. 7), the radial tension strain 90 generally remains the same, and the circumferential compression strain 92 decreases to a location designated as the "transition line" and identified by the number 94 in FIG. 7 where circumferential tension strain designated by the number 102 (see FIG. 8) begins in the glass and the radial tension strain 90 (see FIG. 8) is present in the glass. For the shaped glass substrate 28 under discussion, e.g. the shaped glass substrate 28 made from the flat glass piece 70 having a diameter of 18 inches (45.72 cm) and a thickness of 0.083 inch (2.1 mm), the transition line 94 is at a position on the shaped glass substrate 28 that corresponds to a position on the flat glass piece 70 about 3 inches (7.62 cm) from the center, i.e. from the center of the center portion 79, of the flat glass piece 70. As the distance from the transition line 94 in a direction toward the bottom area 80 of the shaped glass substrate 28 increases, the shaped glass substrate has increasing circumferential tension strain designated by the number 102 and has the radial tension strain 90 (see FIG. 8).

As is appreciated by those skilled in the art, the strains in the shaped glass substrate 28 can be measured in any convenient manner. In the practice of the invention, the strains of the shaped glass piece 28 under discussion were calculated using the ANSYS finite element computer program.

The sodium barrier coating 66 in the circumferential compression area 103 of the shaped glass substrate 28, i.e. the area between the periphery 84 and the transition line 94 of the shaped glass substrate 28 (see FIG. 7) was observed to have buckling in the radial direction perpendicular to the compressive strain in the glass. In the location of the transition line 94, the barrier coating 66 was observed to have an area of radial cracks. In the circumferential tension area 104 of the shaped glass substrate 28, i.e. the area between the transition line 94 and the bottom area 80 of the shaped glass substrate 28 (see FIG. 7), the barrier coating 66 was observed to have small random fissures or cracks.

As discussed above, the maximum compressive stresses are at the marginal edge portions 81 of the shaped glass substrate 28 (see FIGS. 5B and 7), and it is expected that maximum buckling of the barrier coating 66 will be present at the marginal edge portions 81. It has also been observed that very few of the suns rays impinging on the marginal edge portions 81 of the initially shaped glass substrate 28 are directed to the focal point or focal area of the shaped glass substrate 28. In view of the foregoing, the marginal edge portion 81 of the initially shaped glass substrate 28 extending a distance from the peripheral edge 84 of the shaped glass substrate 28 equal to 10-15% of the distance measured from the peripheral edge 84 to the center of the bottom area 80 of the initially shaped glass substrate was removed. In one non-limiting embodiment of the invention, for a shaped glass substrate 28 shaped from a flat glass piece 70 having a diameter of 18 inches (45.72 cm), a section of about 2 inches (5.08 cm) measured from peripheral edge 84 toward the bottom 80 (see FIG. 5B) of the shaped glass substrate was cut off to remove portions of the highly strained and optically distorted glass. Additional portions of the peripheral edge of the shaped glass substrate were removed to provide the sides 33 (see FIG. 3) of the shaped glass substrate 28.

The discussion is now directed to the observed and/or expected defects caused by the fissures and/or cracks in the barrier coating 66, and the observed and/or expected defects caused by buckling of the barrier coating. It is expected that cracks or fissures that extend through the thickness of the barrier coating 66 will provide passageways for moisture in the atmosphere and the sodium ions leeching out of the glass to interact with one another to form sodium compound precipitates which can deposit on surface 108 of the barrier coating 66 (see FIG. 7) and/or between the barrier coating 66 and the concave surface 30 of the shaped glass substrate 28. The sodium compounds on the surface 108 of the barrier coating 66 can change the specular surface of the barrier coating 66 to a non-specular or diffusing surface, and the sodium compound precipitates between the barrier coating 66 and the convex surface 30 can cause separation of the barrier coating 66.

The defect of buckling can change the surface 108 of the barrier coating 66 from a specular surface to a non-specular surface, and severe cases of buckling can, in addition, cause cracks in the barrier coating.

Figure 9A:
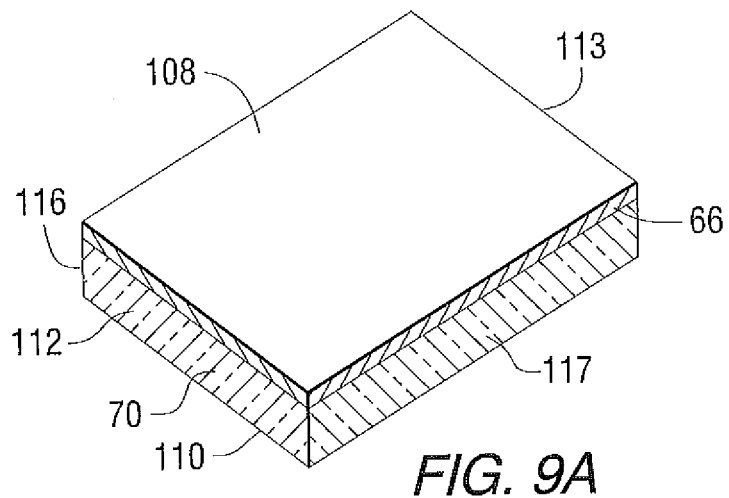
FIG. 9A is an isometric view of a segment of the glass piece shown in FIG. 4.
Figure 9B:
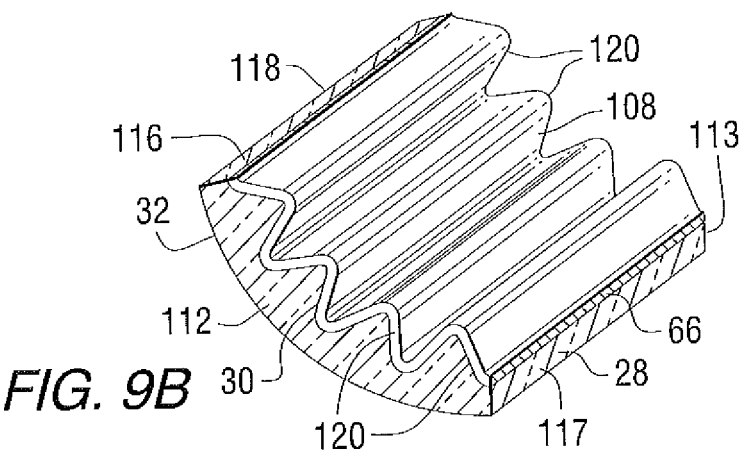
FIG. 9B is an isometric view of the segment shown in FIG. 9A after the glass piece is shaped into the shaped glass substrate, the coating having peaks and valleys.
Figure 9C:
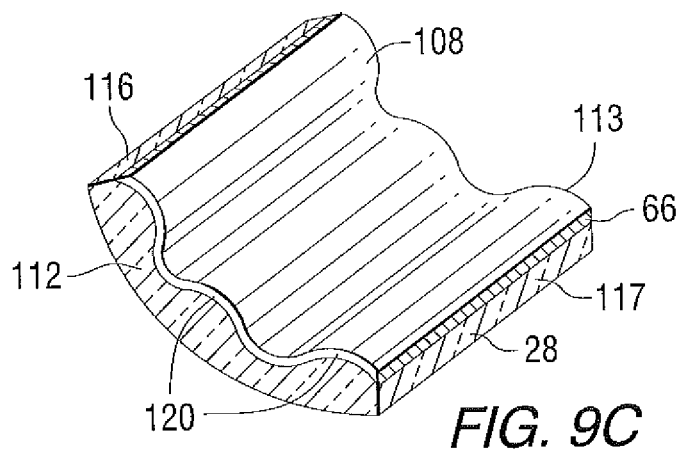
FIG. 9C is a view similar to the view of FIG. 9B showing a segment of the shaped glass substrate made according to the teachings of the invention, the coating having reduced number of peaks and valleys, reduced heights of peaks and reduced depths of valleys.
Figure 10:
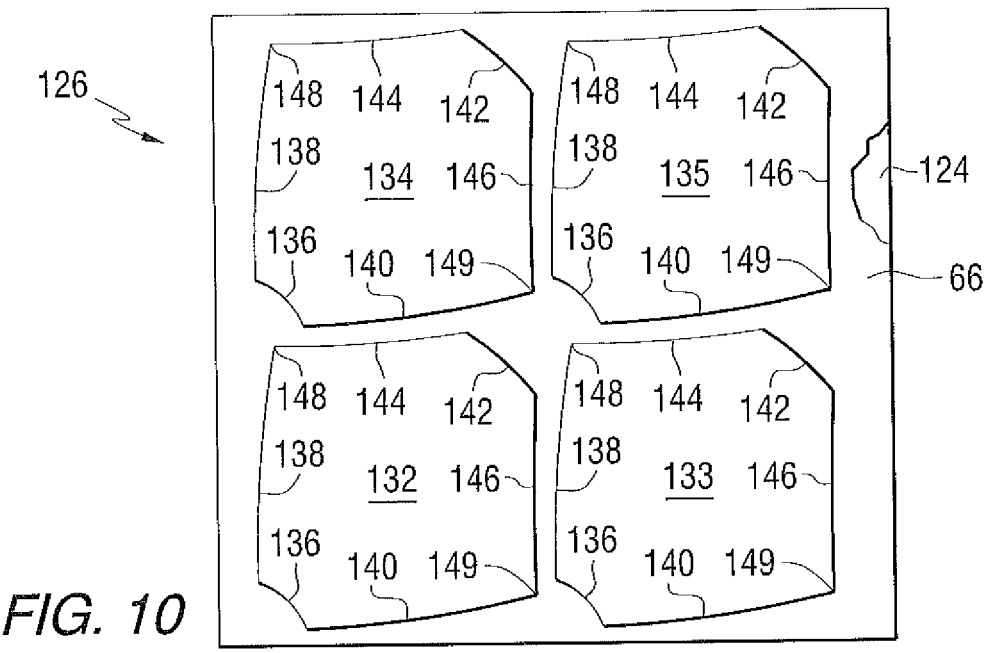
FIG. 10 is a view similar to the view of FIG. 4 showing another embodiment of the invention to make the shaped solar mirror of the invention that includes cutting a coated glass into segments.

With reference to FIGS. 9A-9C as needed, the barrier coating 66 on a segment 110 of the glass piece 70 (FIG. 9A) expected to be in the area of circumferential compression 103 (see FIG. 7) has a length measured between sides 112 and 113, and a width measured between sides 116 and 117. After the glass piece 70 is shaped into the shaped glass substrate 28, the segment 110 of the flat glass piece 70 corresponds to segment 118 of the shaped glass substrate 28. The convex surface 32 of the segment 118 of the shaped glass substrate 28 has a length as measured between the sides 112 and 113 of the segment 118 that is slightly greater than the same as the length measured between sides 112 and 113 of the segment 110 of the flat glass piece 70, and the convex surface 32 of the segment 118 of the shaped glass substrate 28 has a width as measured between sides 116 and 117 of the segment 118 that is less than the width of the segment 110 of the flat glass piece 70 as measured between sides 116 and 117 of the segment 118. The concave surface 30 of the segment 110 of the shaped glass substrate 28 has a length as measured between sides 112 and 113 of the segment 118 that is slightly greater than the length measured between sides 112 and 113 of the segment 110 of the flat glass piece 70, and the concave surface 30 of the segment 118 of the shaped glass substrate 28 has a width as measured between sides 116 and 117 of the segment 118 that is less than the width of the flat glass piece 70 as measured between sides 116 and 117 of the segment 118.

The difference in the increase between the length of the convex surface 32 and the length of the concave surface 30 as measured between the sides 112 and 113 of the segment 18 is small. The difference in the decrease between the width of the concave surface 30 as measured between the sides 116 and 117 of the segment 118 is greater than the difference between the length of the concave side and convex side of the segment 118. By was of illustration and not limiting to the invention, a measured expansion between the sides 112 and 113 of the segment 110 and the sides 112 and 113 of the segment 118 was 2-6% for both the concave side and the convex side. The contraction between the sides 116 and 118 of the segment 110 and the sides 116 and 118 of the segment 118 measured at the perimeter of the shaped glass substrate 28 was 14% with the concave side 30 having an contraction of 14% and the convex side 32 having a contraction of 13%. At the bottom 80 of the shaped glass substrate 28, the elongation for the convex and concave sides was 5% and 4%, respectively.

The length and width of the barrier coating 66, on the other hand, remains the same and buckles because of the reduction of the width of the concave and convex surfaces of the shaped glass substrate 28 compared to the corresponding width of the flat glass piece 70, commonly referred to as strain. More particularly, the glass is viscous during the shaping process, and the buckling of the barrier coating 66 changes the contour of the concave surface 30 of the shaped glass substrate 28 to a surface having folds 120, e.g. a corrugated surface (see FIG. 9B) to accommodate the decrease in the width of the surface 72 of the flat glass piece 70. The folds 120 change the surface 108 of the barrier coating 66 and the concave surface 30 of the shaped glass substrate 28 from a specular surface in FIG. 9A to a non-specular or diffusing surface in FIG. 9B. In the first instance (FIG. 9B), as the thickness of the barrier coating 66 increases, e.g. the barrier coating increases to a thickness of 160 nanometers ("nm"), while the amount of shrinkage of the width of the flat glass piece remains the same, the number of folds 120 and the height of the folds 120 increases, increasing the percentage of diffused reflected sun rays 37 and 43 (see FIGS. 2 and 2A). In the second instance (FIG. 9C) as the thickness of the barrier coating 66 decreases, e.g. the barrier coating 66 decreases to a thickness of 60 nm, while the amount of shrinkage of the flat glass piece 70 remains the same, the number of folds 120 and the height of the folds in the second instance (FIG. 9C) is less than the number of folds 120 and the height of the folds 120 in the first instance (see FIG. 9B), decreasing the percentage of diffused reflected sun rays 37 and 43 (see FIGS. 2 and 2A). As mentioned above, the area 103 of the circumferential compression (see FIG. 7) decreases as the distance from the periphery 84 of the shaped glass substrate 28 increases (see FIGS. 6-8); therefore the percent shrinkage of the circumferential width of the concave surface 30 of the shaped glass substrate 28 decreases as the distance from the periphery 84 of the shaped glass substrate 28 increases, and the thickness of the barrier coating 66 can be increase without increasing the number of folds 120 and the amplitudes of the folds 120 (see FIGS. 9B and 9C).

In one non-limiting embodiment of the invention, the thickness of the barrier coating 66 is selected to have sodium barrier properties and to minimize buckling. More particularly, the minimum thickness of the barrier coating 66 is selected to prevent the sodium ions from reacting with moisture in the atmosphere to convert the sodium ions to sodium compound precipitates and to minimize buckling. As is appreciated by those skilled in the art, the mechanism of sodium ions moving out of the glass is a diffusion process and for purposes of this invention the parameter of interest is the amount of sodium ions present in the glass. The diffusion rate, size of the alkali ion, e.g. the sodium ion, and the energy to drive the sodium ion to the surface of the shaped glass substrate 28 is not considered relevant to the present discussion because the use of the solar mirror is a long term use, e.g. 30 years.

Based on the forgoing, the amount of alkali ions or sodium ions in glass is a function of the glass composition and the thickness of the glass piece, e.g. as the thickness of the glass piece 70 or of the shaped glass substrate 28 increases, the number of sodium ions in the glass piece increases, and the thickness and/or density of the barrier coating is preferably increased. For a soda-lime-silica glass the sodium concentration is generally 14 weight percent. In one non-limiting embodiment of the invention the parabolic shaped mirror 22 is made of a glass substrate having a thickness of 0.083 inch (2.1 millimeter). In this non-limiting embodiment of the invention, the barrier coating is an MSVD coating of an oxide of 85 atomic percent silicon and 15 atomic percent aluminum. The minimum coating thickness to prevent sodium ions from reacting with moisture in the environment to convert the sodium ion to sodium compound precipitates is 40 nanometers (hereinafter also referred to as "nm"). As is appreciated, any thickness above the minimum thickness prevents sodium ions from reacting with moisture in the environment; however, as the thickness of the barrier coating 66 increases, the severity of the buckling increases. In the practice of the invention, the barrier coating 66 in the circumferential tension area 104 (see FIG. 7) is preferably in the range of 40-100 nm, more preferable in the range of 60-100 nm, and most preferably in the range of 60-80 nm.

Figure 5A:
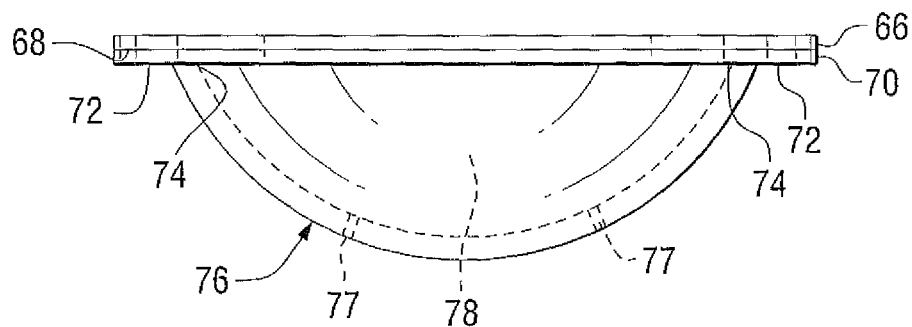
FIG. 5A is a side elevated view of a vacuum mold having the piece of glass of FIG. 4 mounted on the open end of the vacuum mold.
Figure 5B:
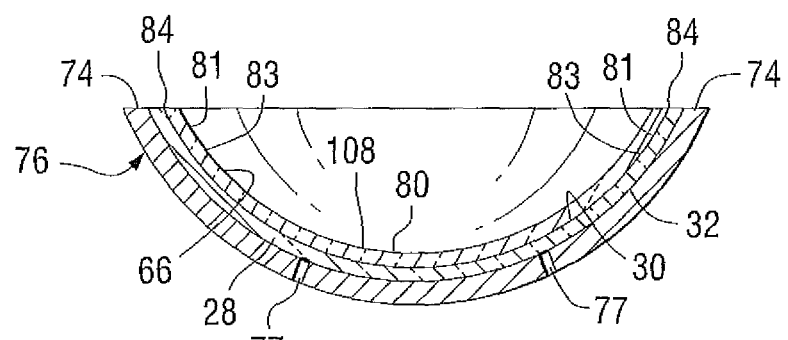
FIG. 5B is a cross sectional view of the vacuum mold having the shaped glass substrate of the invention in the interior of the vacuum mold.

As discussed above, the shaping of the flat glass piece 70 is shaped using in the vacuum mold 76 (see FIGS. 5A and 5B). After the flat glass piece 70 is shaped, the shaped glass substrate is removed from the mold 76 when the glass is dimensionally stable and is annealed. For purposes of the invention, the glass is considered to be dimensionally stable when the shaped glass can support its own weight without changing its shape. For the glass disclosed in U.S. patent application Ser. No. 12/275,264 filed Nov. 21, 2008 and U.S. Pat. No. 5,030,594, the glass is dimensionally stable at a temperature of 1050° F. The annealing process reduces the intrinsic stresses in the barrier coating 66 and in the shaped glass substrate 28 to minimize residual stresses so that the barrier coating and the shaped glass substrate 28 can be cut without shattering the substrate 28 or fracturing the barrier coating. The annealing equipment and rate at which the flat glass substrate 28 is annealed is not limiting to the invention, and any equipment for, and method of, and rate of, annealing known in the art can be used in the practice of the invention. Annealing coated and uncoated glass articles is well known in the art and no further discussion is deemed necessary.

The invention is not limited to the thickness of the glass piece 70, and the glass piece can be any thickness. In the preferred practice of the invention, the glass piece 70 is preferably thin to provide a light-weight shaped glass substrates 28. Although thin glass is preferred, the glass thickness should be sufficient thick to have structural stability. As used herein the term "structural stability" means the glass has to be processed from the flat glass piece 70 (see FIG. 4) to the parabolic shaped mirror 22 (see 3) using a vacuum mold or a pressing mold with minimal glass breakage. In the practice of the invention, the glass thickness is preferably in the range of 0.075-0.126 inch (1.9-3.2 mm), more preferably in the range of 0.078-0.110 inch (2.0-2.8 mm), and most preferably in the range of 0.083-0.091 (2.1-2.3 mm).

In the preferred practice of the invention, the barrier coating 66 includes an oxide of 15 atomic percent aluminum and 85 atomic percent silicon. Increasing the atomic percent of aluminum makes the coating stiffer. Although a stiffer coating reduces buckling, it is prone to cracking. The cracks in the coating can result in moisture in the atmosphere reacting with the sodium ions converting the sodium ions to sodium compounds. For barrier coatings of an oxide of aluminum and silicon, the coatings preferably include 30-100 atomic percent silicon and 0-70 atomic percent aluminum, more preferably 50-95 atomic percent silicon and 5-50 atomic percent aluminum, and most preferably include 60-90 atomic percent silicon and 10-40 atomic percent aluminum. As can be appreciated, the invention is not limited to a barrier coating or film of an oxide of aluminum and silicon, and any sodium barrier film of the type known in the art can be used in the practice of the invention. Types of barrier coatings that can be used in the practice of the invention include, but are not limited to, the coatings or films disclosed in United States Printed Publication 2007/0275253A1, which document in its entirety are hereby incorporated by reference.

As is appreciated by those skilled in the art of MSVD coating, the deposition parameters can be altered to reduce intrinsic stresses in the coated barrier film; however, as discussed above, the barrier film and the shaped glass substrate are annealed at the same time to minimize residual stresses so that the shaped glass substrate 28 can be cut without shattering the substrate 28. Therefore reducing the intrinsic stress in the barrier coating during the deposition of the coating is optional and not limiting to the invention.

As can now be appreciated by those skilled in the art, the strain patterns for the convex side of the shaped glass piece 28 are similar to the strain patterns for the concave side of the shaped glass piece 28.

With reference to FIGS. 10-13, as needed, the invention contemplates reducing the strain in the shaped glass substrate 28 by cutting segments from a flat glass sheet; shaping the segments and joining the shaped segments together to provide a shaped glass substrate similar in shape to the shaped glass substrate 28 (see FIG. 3). In one non-limiting embodiment of the invention, surface 124 of a flat glass sheet 126 is coated with the barrier coating 66 (see FIG. 10). The surface 124 of the glass sheet 126 is expected to be the concave surface 128 of the shaped glass substrate 130 (see FIGS. 12 and 13). Four flat segments 132-135 are cut from the glass sheet 126. Each of the flat segments 132-135 includes a radiused corner 136 joining sides 138 and 140; a flat end 142 joining sides 144 and 146; side 138 is joined to side 144 at corner 148, and side 140 is joined to side 146 at corner 149.

Each of the segments 132-135 are sized such that shaping the segments 132-135 as discussed below provides ¼ of the shaped glass substrate 130 (see FIGS. 12 and 13) such that shaping the segments 132-135 in accordance with the invention and joining the shaped segments together in a manner discussed below forms the shaped glass substrate 130, which is similar to the shaped glass substrate 28 (see FIG. 3).

The invention is not limited to the manner in which the segments 132-135 are cut from the glass sheet 126, and any of the cutting or scoring techniques known in the art can be used in the practice of the invention. The edges of the segments 132-135 can be seamed as is known in the art for purposes of safety. Each of the flat segments 132-135 are shaped in any convenient manner using any of the pressing methods and equipment known in the art, e.g. but not limited to press bending using a solid upper mold having a shaping surface and a lower mold having a flexible supporting surface; a solid upper mold having a shaping surface and a lower ring mold, and a vacuum upper mold having a shaping surface, e.g. as disclosed in U.S. Pat. Nos. 7,240,519 and 7,437,892 which patents in their entirety is hereby incorporated by reference.

Figure 11:
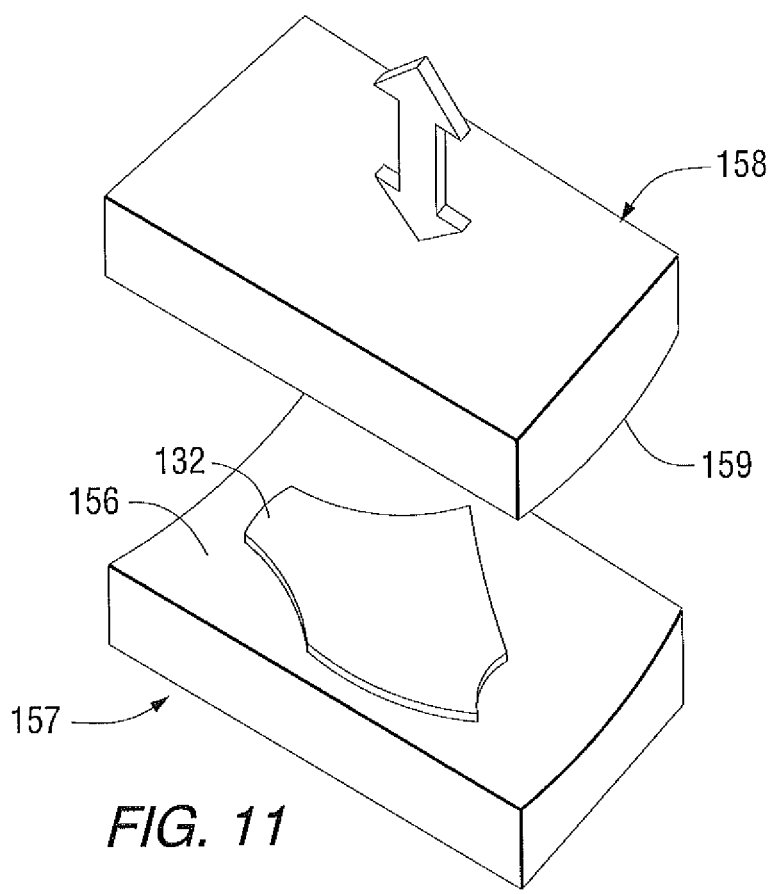
FIG. 11 is an isometric top view of a glass sheet pressing arrangement that can be used in the practice of the invention to shape the segments cut from the coated glass of FIG. 10.

In the preferred practice of the invention, the segments 132-135 are shaped using an upper vacuum mold having a shaping surface. With reference to FIG. 11, one of the segments 132-135, e.g. the segment 132 is heated to a viscosity in the range of $1.00 \times 10^{7.8}$ poise to $5.36 \times 10^9$ poise and provided on curved surface 156 of lower support member 157. Upper vacuum shaping mold 158 having a shaped surface and the support member 157 are moved relative to one another, e.g. the upper mold 158 moved toward the lower support member 157 to bring the segment 132 into contact with the shaping surface 159. Vacuum is pulled through the shaping surfaces 159 of the upper mold 158 to shape the segment 132. The process is repeated to shape the remaining three segments 133-135 to provide four shape segments 160-163. Optionally, the four segments can be shaped simultaneously by providing a shaping mold with four shaping areas.

The reflective coating 34 and the protective coating 53 (see FIG. 2) is applied to the convex surface of the shaped segments 160-163.

In the preferred practice of the invention, the barrier coating 66 is applied to the surface 124 of the flat glass sheet 126 before the segments 132-135 are cut from the glass sheet 126. The invention, however, contemplates applying the barrier coating 66 to the flat segments 132-135 or the shaped segments 160-163. In the practice of the invention, the reflective coating 34 and the protective coating 54 are applied to the convex surface of the shaped segments 160-163; the invention, however, contemplates applying the reflective coating 34 and the protective coating 53 to the surface of the glass sheet 126 opposite to the surface 124 of the glass sheet. As can be appreciated, if the reflective coating 34 and the protective coating 54 are applied before the segments 132-135 are shaped, the reflective coating 34 and the protective coating 54 have to withstand the temperatures at which the glass segments 132-135 are shaped. Optionally the protective coating 54 can be applied after the segments are shaped.

The invention is not limited to the number of segments 132-135 joined to make the shaped glass substrate 130, and the shaped glass substrate 130 can be formed by joining 2, 3, 4, 5 or more segments. As can now be appreciated, the greater the number of shaped segments joined to form the shaped glass substrate 130, the greater will be the reduction in the strain in the shaped glass substrate 28 or 130.

Figure 12:
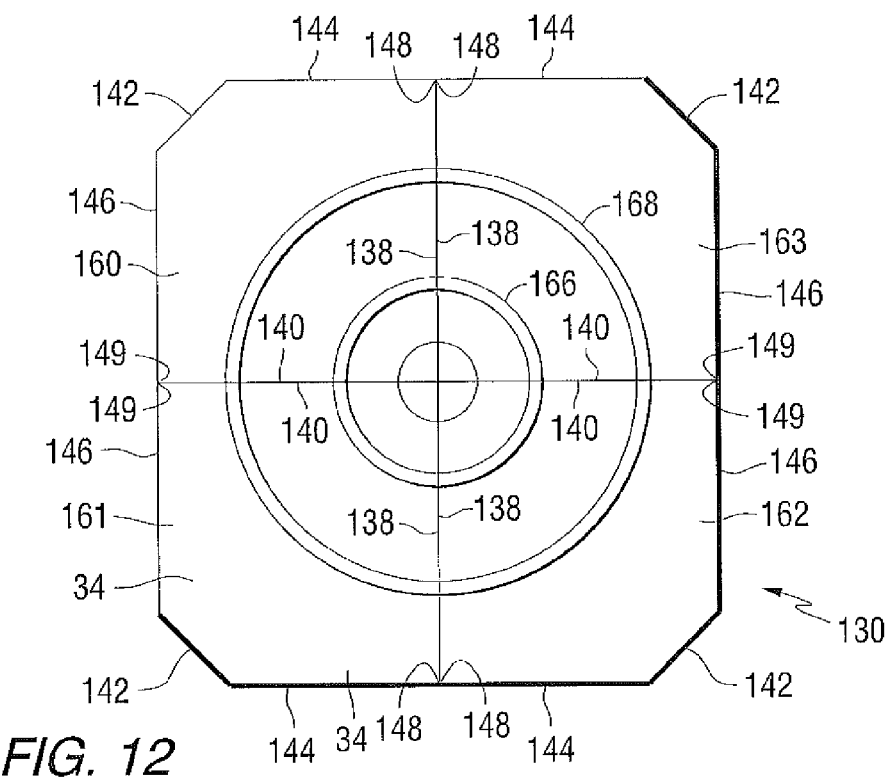
FIG. 12 is a top view of a shaped solar mirror of the invention made by joining the shaped glass segments.
Figure 13:
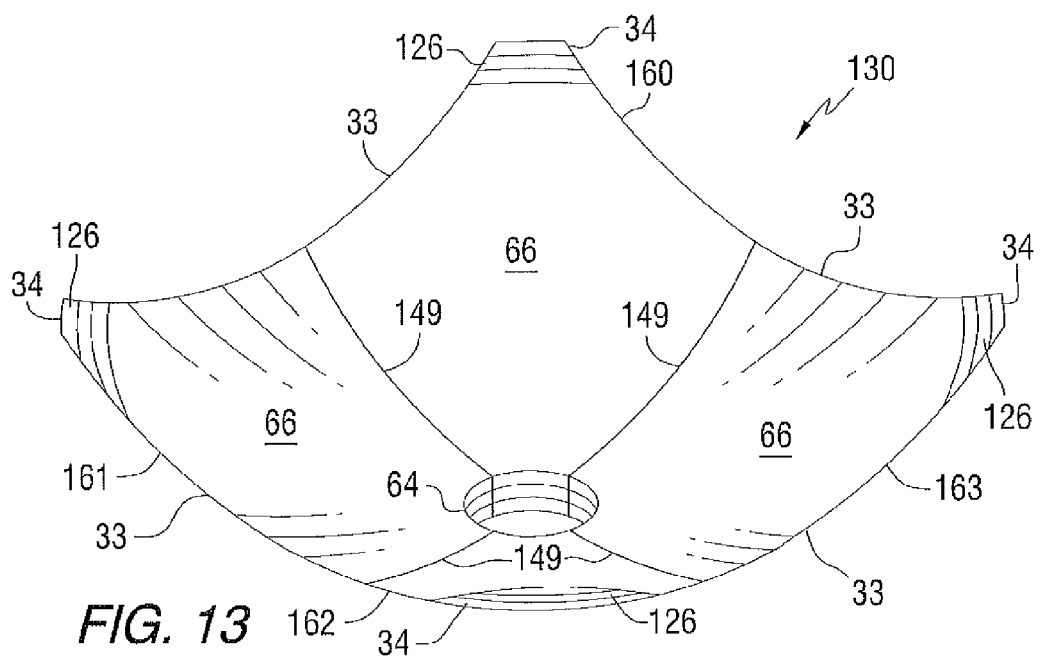
FIG. 13 is a view similar to the view of FIG. 3 showing the shaped solar mirror of the invention made with the shaped glass segments.

With reference to FIG. 13, the shaped glass segments 160-163 are joined together in any convenient manner. In one non-limited embodiment of the invention, the segments 160-163 are positioned together to form the shaped glass substrate 130, and a pair of rings 166 and 168 (shown only in FIG. 12) are secured to the reflective coating 34 by an adhesive. In another non-limiting embodiment of the invention, the rings 166 and 168 are joined to the convex surface 32 of the shaped glass substrate. Thereafter, the convex surface of the joined shaped segments 160-163 and the rings 166 and 168 are coated in any convenient manner with the reflective coating 34 and the protective coating 53. In still another non-limiting embodiment of the invention, the sides of the shaped segments are joined together by an adhesive, e.g. an adhesive joins the sides 140 of adjacent ones of the shaped segments together, and the sides 138 of adjacent ones of the shaped segments together as shown in FIG. 12. As viewed in FIGS. 10 and 13, the radiused corners 136 form the cut out 64 of the shaped substrate 130.

The invention is not limited to manner in which the dimensions of the flat segments 132-135 are derived. For example and not limiting to the invention, the dimensions of the flat segments can be derived from a computer program, and from constructing the shaped parabolic substrate, cutting the shaped substrate into the desired number of segments, and measuring the sides of the segments.

It will be readily appreciated by those skilled in the art that modifications can be made to the non-limiting embodiments of the invention without departing from the concepts disclosed in the foregoing description. Accordingly, the particular non-limiting embodiments of the invention described in detail herein are illustrative only and are not limiting to the scope of the invention, which is to be given the full breadth of the appended claims and any and all equivalents thereof.

What is claimed is:

1. A solar reflecting mirror having a curved reflective surface, comprising:
   a plurality of transparent shaped segments;
   securing means to hold the segments together to provide a shaped transparent substrate having a convex surface and an opposite concave surface having a focal area, and
   a solar reflecting coating over one of the surfaces of the shaped substrate, wherein the coating reflects visible and infrared waves of the electromagnetic spectrum toward the focal area of the shaped transparent substrate.

2. The solar reflecting mirror of claim 1 wherein the shaped transparent substrate is made of glass and the shape is selected from the group of a parabolic shaped substrate, and a spherical shaped substrate.

3. The solar reflecting mirror of claim 2 wherein each of the transparent shaped segments comprises six sides, wherein three sides of each of the shaped segments form a part of the periphery of the shaped substrate, two of the sides of the shaped segments are joined to adjacent sides of two other shaped segments and one side of the shaped segments provides a part of an inner wall of a hole.

4. The solar reflecting mirror of claim 3 wherein the one side of each segment that provides a part of an inner wall of a hole has a radius to provide the shaped substrate with a center circular hole, and the three sides of each of the shaped segments that form a part of the periphery of the shaped substrate are linear sides.

5. The solar reflecting mirror according to claim 1 wherein the securing means comprises one or more rigid rings.

6. The solar reflecting mirror according to claim 5 wherein the rings are secured to the convex surface of the shaped segments and the reflective coating is over the rings and the convex surface of the shaped glass substrate.

7. The solar reflecting mirror according to claim 5 wherein the convex surface of the shaped segments has the reflective coating and the rings are secured to the reflective coating.

8. The solar reflecting mirror according to claim 1 wherein the securing means comprises an adhesive securing adjacent sides of the shaped segments together.

9. A method of making a shaped solar reflecting mirror comprises:
   shaping two or more flat transparent segments to provide two or more shaped transparent segments wherein each of the shaped transparent segments comprises part of the shaped transparent substrate,
   securing the shaped transparent segments together to provide the shaped transparent substrate, wherein the shaped transparent substrate comprises a convex surface and opposite concave surface having a focal area, and
   providing a reflective coating over at least one of the surfaces of the transparent substrate.

10. The method according to claim 9 wherein the reflective coating is over the convex surface of the shaped substrate.

11. The method according to claim 9 wherein the shaping two or more flat transparent segments comprise:
   cutting two or more pieces from a flat transparent sheet, and
   press bending each pieces to provide the shaped segments, wherein perimeter of the shaped transparent substrate has corners and a linear side between adjacent corners.

12. The method according to claim 9 wherein securing the shaped segments together comprises positioning the segments together to form the shaped substrate and securing a rigid member to the convex surface of each of the shaped segments to secure the shaped segments together.

13. The method according to claim 9 wherein securing the shaped segments comprises applying an adhesive layer to selected edges of the shaped segments and biasing selected edges of the segments together to secure the shaped segments together.

14. The method according to claim 9 wherein each of the transparent shaped segments comprises six sides, wherein three sides of each of the shaped segments form a part of the periphery of the shaped substrate, two of the sides are joined to adjacent sides of two other shaped segments and one side provides a part of an inner wall of a hole.

15. The method according to claim 9 wherein securing the shaped segments together is practiced before the reflective coating is applied over at least one of the surfaces of the transparent substrate.

16. The method according to claim 9 wherein the providing a reflective coating is practiced by applying the reflective coating to a surface of the flat segments designated to be the convex surface of the shaped substrate and securing the shaped segments is practiced after the reflective coating is applied over the transparent segments.

* * * * *